United States Patent [19]
Hocker

[11] Patent Number: 5,373,346
[45] Date of Patent: Dec. 13, 1994

[54] DATA GATHERING COMPUTER AND ANALYSIS DISPLAY COMPUTER INTERFACE SYSTEM AND METHODOLOGY

[75] Inventor: Lon Hocker, North Falmouth, Mass.

[73] Assignee: Onset Computer Corp., Pocasset, Mass.

[21] Appl. No.: 136,904

[22] Filed: Oct. 18, 1993

Related U.S. Application Data

[63] Continuation-in-part of Ser. No. 714,859, Jun. 13, 1991, abandoned.

[51] Int. Cl.⁵ ............................................... G01B 7/00
[52] U.S. Cl. ..................................... 364/550; 364/554; 364/556; 364/580; 364/571.01; 346/33 WL; 346/33 TP
[58] Field of Search ............... 364/550, 422, 554, 556, 364/580, 138, 139, 130, 571.01–571.08, 481, 483, 431.03, 431.04, 424.03, 424.04; 367/25; 395/700; 346/33 WL, 33 TP

[56] References Cited

U.S. PATENT DOCUMENTS

| | | | |
|---|---|---|---|
| 4,661,932 | 4/1987 | Howard et al. | 346/33 WL |
| 4,730,258 | 3/1988 | Takeda et al. | 364/130 |
| 4,747,060 | 5/1988 | Sears, III et al. | 346/33 WL |
| 4,996,643 | 2/1991 | Sakamoto et al. | 364/424.03 |
| 5,005,142 | 4/1991 | Lipchak et al. | 364/550 |
| 5,023,791 | 6/1991 | Herzberg et al. | 364/424.03 |
| 5,031,155 | 7/1991 | Hsu | 367/25 |
| 5,077,671 | 12/1991 | Leslie et al. | 364/424.04 |
| 5,122,976 | 6/1992 | Bellows et al. | 364/550 |
| 5,239,470 | 8/1993 | Komatsu | 364/424.04 |
| 5,247,467 | 9/1993 | Nguyen et al. | 364/571.02 |
| 5,249,127 | 9/1993 | Komatsu | 364/550 |
| 5,251,151 | 10/1993 | Demjanenko et al. | 364/550 |
| 5,313,388 | 5/1994 | Cortis | 364/424.04 |
| 5,321,638 | 6/1994 | Witney | 364/571.01 |

Primary Examiner—Emanuel T. Voeltz
Assistant Examiner—Hal D. Wachsman

[57] ABSTRACT

A data gathering computer and host data display computer interface system, methodology and protocol are described that utilize a shared control program. The data gathering computer uses this program to determine what measurements are to be made and when and how the data is to be compressed into its data storage. The host display and analysis computer receives and utilizes the control program and the stored data from the data gathering computer, and expands the stored data responsive to the control program, and reconstructs the value and engineering units of the values measured as well as the time that the measurements were made. By passing the control program gathered by the data gathering computer, a single display computer program is all that is needed to display any number of completely different data streams from any number of data gathering computers.

21 Claims, 4 Drawing Sheets

DATA GATHERING COMPUTER AND ANALYSIS DISPLAY COMPUTER INTERFACE SYSTEM AND METHODOLOGY

CROSS REFERENCE TO RELATED APPLICATION

This application is a continuation-in-part of application Ser. No. 07/714,859, filed Jun. 13, 1991, now abandoned.

BACKGROUND OF THE INVENTION

This invention relates to an interface system, methodology and protocol used by data gathering computers to gather data, and by analysis and display computers to display and/or analyze the data gathered by the data gathering computers, and more particularly to an interlace system, methodology and protocol for use by a data gathering computer which utilizes a unified control program to control the gathering and storing of data and a display and analysis computer which utilizes the unified control program and stored data to reconstruct the data values, units, and other information.

This logging equipment is used to measure sensors and store the results of these measurements for later analysis. A logger could, for example, measure three sensors (e.g., temperature, pressure and humidity) once a second and store the results in memory. Usually when a sensor is measured by a computer, the result is an integer value which can be converted to engineering units by a mathematical equation. The logger could store these results unambiguously by first converting the data to engineering units and then storing them, for example, in a form below:

Time: Jul. 19, 1990 10:56:38
Tire Pressure: 15.43 psi
Engine Temperature: 25.34° C.
Intedor RH: 73%
Time: Jul. 19, 1990, 10:56:39
Tire Pressure: 15.43 psi
Engine Temperature: 25.34° C.
Interior RH: 73%

Here the first line defines the time that the measurement was taken, and the subsequent lines of each block show the parameter measured, its value, and the units of measurement. Even this might not be enough, for example, if two pressures were measured, a location of these two measurements would be needed as well (manifold pressure and tire pressure, for example).

This is an extremely inefficient storage method for storing data, since a large fraction of the information is repeated each time it is stored. Most data logging equipment eliminate the redundant information by storing the measurement result in its most primitive form, leaving the conversion to engineering units for a separate computer that is used to analyze the stored data. This optimizes the storage efficiency, but makes it impossible for the data analysis computer to convert the data to engineering units without additional information telling it the sequence of measurements and the equation needed to convert the stored data to engineering units.

One solution to this problem is to write a separate data analysis program for each data gathering program, an approach that has two disadvantages. First, for every modification of the data gathering program, a similar modification must be made to the data analysis program, and second, each newly written analysis program must be tested to confirm its proper operation. These two problems can vastly increase the time needed and cost involved in data analysis.

It is therefore an object of the present invention to provide an interface system, methodology and protocol for use by a display and analysis computer and a data gathering computer wherein only one program is required for both controlling the measurements and storage, and for guiding the analysis of the stored data, instead of requiring two programs (one for gathering and one for analysis), greatly simplifying the process of data gathering and analysis. This single program can be called the "unified program."

SUMMARY OF THE INVENTION

A data gathering computer and host data display computer interface system, methodology and protocol utilize a shared unified control program. The data gathering computer uses this program to determine what measurements are to be made and when and how the data is to be compressed into its data storage. The host display and analysis computer receives and utilizes the control program and the stored data from the data gathering computer, and expands the stored data responsive to the control program, and reconstructs the value and engineering units of the values measured as well as the time that the measurements were made. By passing the unified control program stored along with the data gathered by the data gathering computer, a single display computer responding to the unified programs, and the stored data is all that is needed to display any number of completely different data streams from any number of data gathering computers.

DETAILED DESCRIPTION OF THE ILLUSTRATED EMBODIMENT

Figure 1:
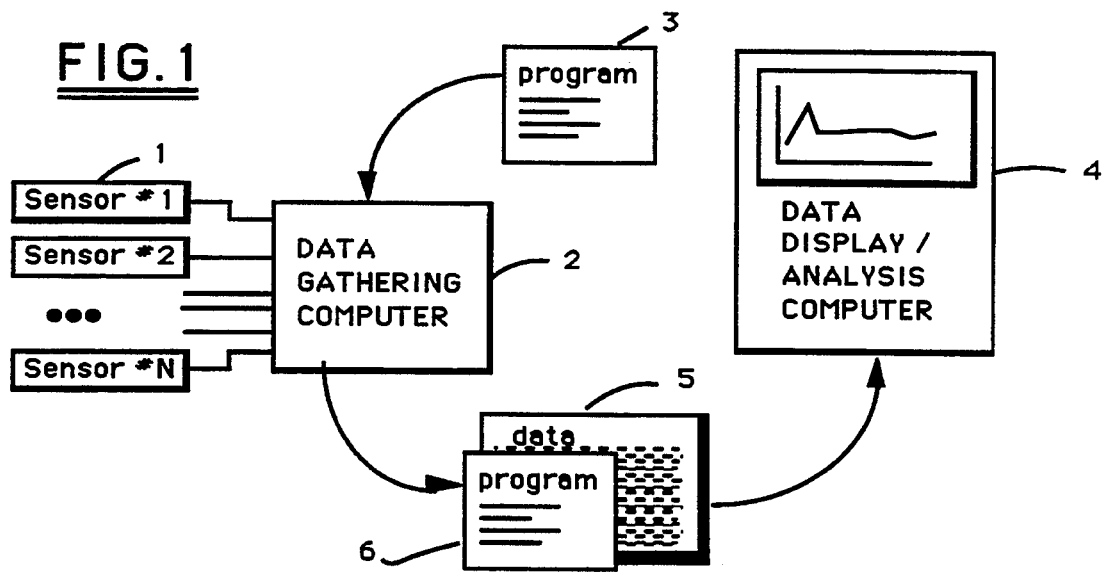
FIG. 1 is a system block diagram illustrating the interface system of the present invention.

FIG. 1 is a system block diagram illustrating the interface system of the present invention.

The data gathering computer, 2, utilizes the unified program, 3, to gather and store data, 5, from sensors, 1. The data gathering computer, 2, then passes the data, 5, along with a copy of the unified program, 6, to the data display/analysis computer, 4, which uses the unified program to expand the data, making it ready for display and/or analysis.

The unified program, 3, is used by the data gathering computer, 2, to collect data from sensors, 1. This data is compressed and stored in the data gathering computer's data storage area. When this data, 5, is transferred to the data display/analysis computer, 4, the data gathering computer, 2, sends with it a copy of the unified program it used to gather the data. The data analysis and display computer uses the unified program sent with the data to reconstruct the time and values of the measurements made by the data gathering computer.

The unified program is a structured set of high level rules and instructions that are used by the data gathering computer to decide which sensor to read at what time, when to store the data, and how to convert the data to "engineering units," units that are understandable to the user. This same set of instructions is independently interpreted by the data analysis computer to reconstruct the measurement sequence and convert the stored data to engineering units. Each instruction provides for independent, but coordinated response in each of the data gathering computer system and the analysis and display system.

Figure 2:
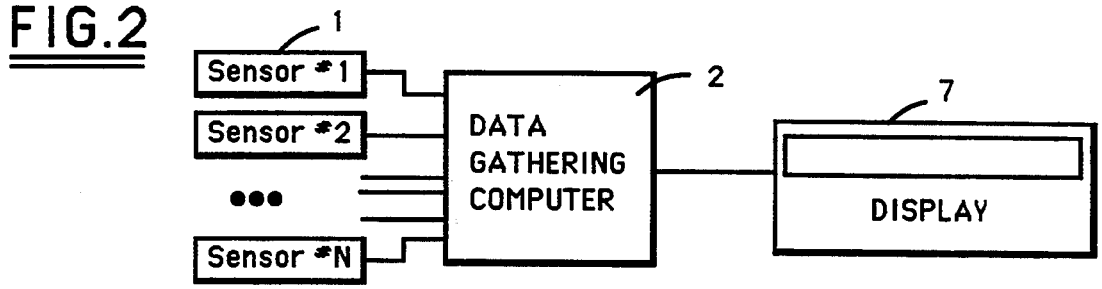
FIG. 2 is a system block diagram illustrating the data gathering computer system of the system of FIG. 1 with additional independent display means.

FIG. 2 is a system block diagram illustrating the data gathering computer 2 and its sensors 1 with an associated display 7 for locally displaying the results of its measurements.

Figure 3:
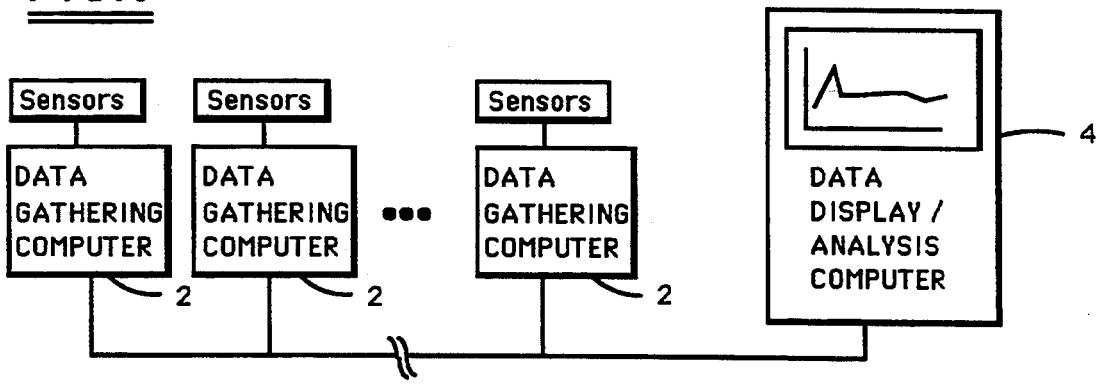
FIG. 3 is a system block diagram illustrating multiple data gathering computer system, each coupling its respective unified program and stored data to a single separate analysis and display computer system.

FIG. 3 shows a number of data gathering computers 2 associated with a single data analysis computer 4.

Separating the Measurements and Associating Times with Them

To work properly, each instruction must have a unique meaning for the data gathering computer, as well as a separate and distinct unique meaning for the data analysis computer. In its simplest form, the data gathering computer has three kinds of program commands:

1. Time interval commands; these commands tell the data logger to allow a certain amount of time to pass.
2. Data storage commands; these commands tell the logger to measure a sensor and store the result.
3. Program flow commands; these commands tell the logger to continue its program execution at another point in its program.

A data analysis program with access to both the program and data stored by the data gathering computer would be able to assign the data to individual sensors and determine the time that each measurement was made. In the example below, the instructions are shown in sequence, with their number in the sequence shown in brackets. The data gathering computer's interpretation is shown in plain text, while the data analysis computer's interpretation is shown in bold.

[1] Wait one second.
add one second to the time counter.
[2] Measure the temperature sensor, store the result.
take the next stored value, treat it as a temperature measurement and associate the value to the time In the time counter.
[3] Measure the pressure sensor, store the result.
take the next stored value, treat it as a pressure measurement and associate the value to the time in the time counter.
[4] Measure the RH sensor, store the result.
take the next stored value, treat it as an RH measurement and associate the value to the time in the time counter.
[5] If storage area not full, loop back to "here."
if more data is available, loop back to "here."
[6] Stop data gathering program.
stop data converting program.

Notice that the data analysis computer simply mimics the time operations and sorts the stored data according to the storage sequence of the data gathering computer. Notice also that the data analysis computer will have no problem separating any sequence of measurements with any combination of time intervals.

Conversion To Engineering Units

The measurements separated out above are not converted to engineering units. An extension of the above technique allows the conversion to be added easily if we add to the storage command a reference to a conversion routine. Step [2] above could be rewritten as:

[2a] Measure the temperature sensor and store the result.
[2b] The temperature sensor is located on the "engine."
[2c] The routine needed to convert this result to engineering units starts at [X].

Later in the program you would find this conversion routine [X].

[X] The measure of this sensor is "temperature."
[X+1] First step in the mathematical procedure to convert measured value to engineering units.
[X+2] Second step . . .
[X+A] Last step . . .
[X+A+1] The unit of measurement is "°C."
[X+A+2] This is the end of the conversion routine.

The data gathering computer will simply ignore steps [2b], and [2c] and the conversion routine starting at [X], but the data conversion routine for the data analysis computer can use them to not only convert the stored number, but also to associate a location, measure, and unit with the converted number. This routine actually could recover the data to the form started with:

Engine Temperature: 25.34° C.

Having the conversion program routine separate from the actual measurement program routine, allows several temperature sensors to share a common conversion program routine. Each could have a separate associated "location" since that is included with the measurement. In the example above, the unit of measurement is placed at the end of the routine to allow the routine to have a switch in it that would allow the result to be displayed in different units according to the wishes of the user, for example:

[X] The measure of this sensor is "temperature."
[X+1] If switch is high, go to [Y], else continue.
[X+2] First step in the mathematical procedure to convert measured value to engineering units (Centigrade).
[X+A] Last step . . .
{X+A+1] The unit of measurement is "°C."
[X+A+2] This is the end of the conversion routine.
[Y] First step in the mathematical procedure to convert measured value to engineering units (Fahrenheit).
[Y+B] Last step . . .
[Y+B+1 The unit of measurements is "°F."
[Y+B+2] This is the end of the conversion routine.

These routines are also available to the data gathering computer allowing it to display the results locally on a built-in display, as shown in FIG. 2, or to transmit it to an external printer.

[1] Measure the temperature sensor, store the result in temporary variable 1.
[2a] Store the number in temporary variable 1.

[2b] The temperature sensor is located on the "engine."
[2c] The routine needed to convert this result to engineering units starts at [X].
[3a] Display the number in temporary variable 1 after converting it.
[3b] The temperature sensor is located on the "engine."
[3c] The routine needed to convert this result to engineering units starts at [X].
[4a] Print the number in temporary variable 1 after converting it.
[4b] The temperature sensor is located on the "engine."
[4c] The routine needed to convert this result to engineering units starts at [X].

To further compress the program, various combinations of storing, displaying, and printing could be combined into single commands, such as:

[2a] Store the number in temporary variable 1, also display and print it after first converting it.
[2b] The temperature sensor is located on the "engine."
[2c] The routine needed to convert this result to engineering units starts at [X].

As before, the data analysis computer would ignore all but the store part of the command, display and printing have no relevance to it.

Parameters besides Program and Data

A full implementation of the system and methodology of the present invention can use information that is not in the program or the stored data. This "header" information is passed to the analysis computer along with the program data.

This information could include, at a minimum, one or more of the following:

The time that the data gathering computer started its program.
The number of measurements taken (or the number of bytes of data stored).
The data gathering computers serial number, and manufacturer.
The revision level of the software used in the data gathering computer.
Notice that this header does not include any information about the individual sensors, time intervals or conversion equations.

In general the header, program and data are presented to the data analysis computer as one file. Additional information should be included in the header part of the file showing where the information is stored in the file. An example of such a header is shown below:
Beginning of file.

1. Number showing the offset to the beginning of the program.
2. Number showing the offset to the beginning of the data.
3. Number showing the offset to an address that holds the number of bytes of stored data.
4. Number showing the offset to an address that holds the time that the data gathering computer started its program.
5. Number showing the offset to an address that holds the data gathering computer's serial number.
6. Etc.

Figure 4:
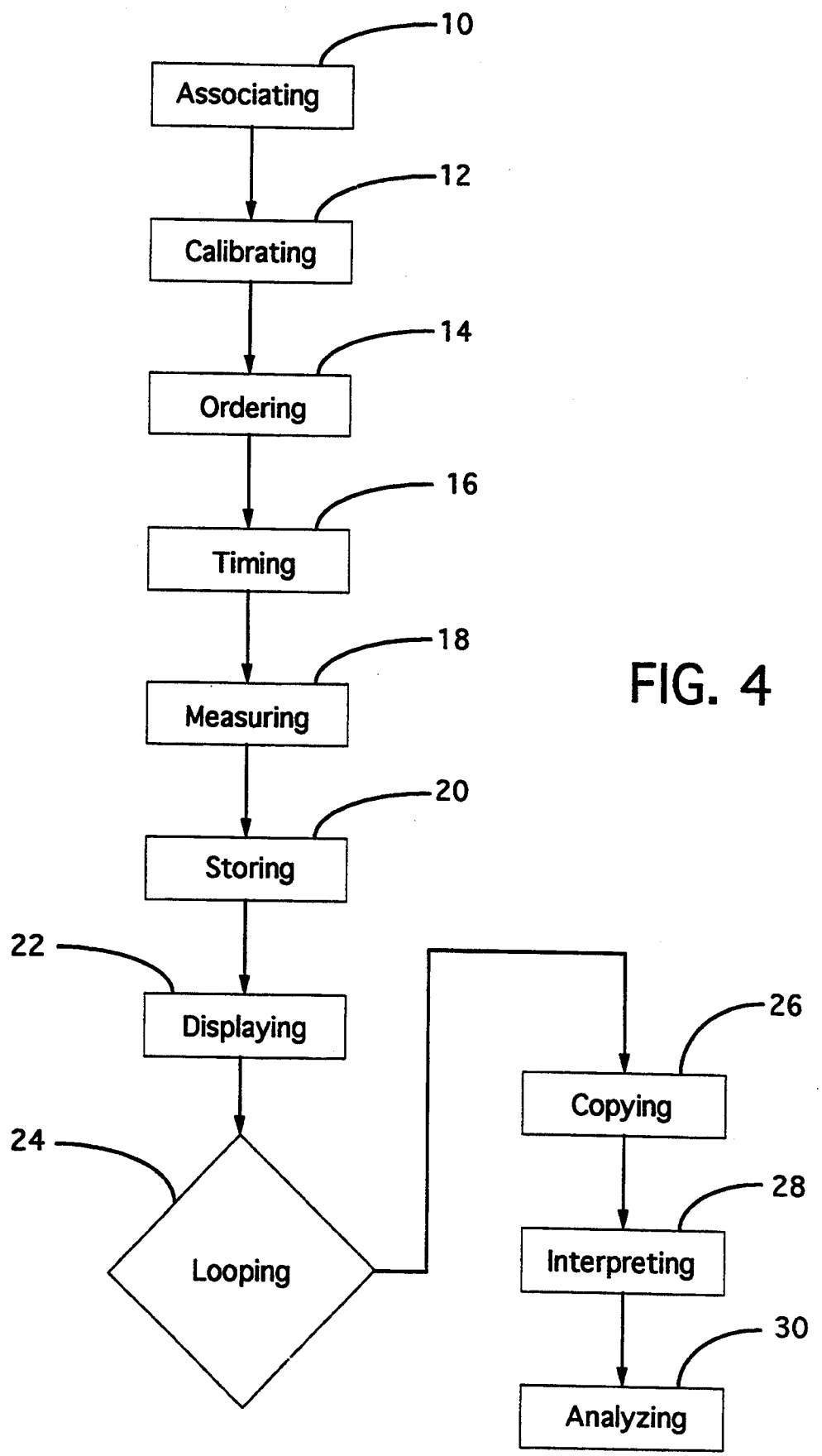
FIG. 4 is a flow chart which illustrates a method for gathering and analyzing data with a unified program according to the present invention.

FIG. 4 is a flow chart which illustrates a method for gathering and analyzing data with the unified program 3 (FIG. 1) according to the present invention. The method utilizes a plurality of steps including Associating 10, Calibrating 12, Ordering 14, Timing 16, Measuring 18, Storing 20. Displaying 22, Looping 24, Copying 26, Interpreting 28, and Analyzing 30. The Associating, Calibrating, Ordering, Timing, Measuring, Storing, Displaying, and Looping steps are executed in the data gathering computer 2 (FIG. 1). The Interpreting and Analyzing steps are executed in the data display/analysis computer 4 (FIG. 1). The execution of the Copying step involves both computers.

Each sensor 1 (FIG. 1) produces an electronic signal (not illustrated), e.g., an analog voltage, in response to the physical property which it measures. Each electronic signal represents a single raw measurement of the physical property. The measurement is "raw" in the sense that the value of the measurement represents the voltage of the electronic signal, rather than an engineering unit, e.g., 5 volts rather than 32° F. The data 5 (FIG. 1) is comprised of a collection of such raw measurements.

The data gathering computer's task is to log measurements of physical properties in remote sites. The environment in such remote sites is often harsh. The data gathering computer is therefore a ruggedly built device. Due to size constraints, typical data gathering computers have limited memory space. At some point in time, the data gathering computer is retrieved to the site of the data display/analysis computer. The measurements logged by the data gathering computer are then downloaded to the data display/analysis computer for indepth analysis.

To accomplish its task, the data gathering computer 2 (FIG. 1) includes a plurality of channels (not specifically illustrated). Each channel is operationally connected to a sensor 1 (FIG. 1), and functions to transmit measurements from the sensor to the unified program 3 (FIG. 1). For example, channel 1 could have a pressure sensor (not specifically illustrated), and channel 2 a temperature sensor (not specifically illustrated). Operationally connecting sensors to the data gathering computer through channels for data transmission is well known in the art.

The first step in the method is Associating 10. Because the unified program 3 (FIG. 1) receives data 5 (FIG. 1) from a plurality of sensors 1 (FIG. 1) which measure different physical properties, each sensor must be associated with a particular channel. In Associating 10, the user modifies the unified program to reflect the manner in which the sensors are connected to the channels. The user enters the Associating information in a high level programming language.

The next step in the method is Calibrating 12 the sensors 1 (FIG. 1). Calibration is necessary for the unified program 3 (FIG. 1) to convert the data 5 (FIG. 1) from the sensors into more meaningful converted data (not illustrated). In the above example, the user might wish to produce converted data representing psi from channel 1, and °F. from channel 2.

Each sensor has a particular response curve. In Calibrating 12, the user enters a mathematical approximation of the sensor's response curve. The mathematical approximation is entered into the unified program using the high level language. The high level language should include functions such as cosine, sine, square, square root, logarithms, addition, subtraction, multiplication, and division. Also, the language should allow the user to use the functions in algebraic equations. In the example data gathering computer given above, the pressure sensor could have the response curve:

$$P = 2014 V/3276800 \qquad \text{Eq. (1)}$$

where P is pressure in psi and V is a signed 16-bit voltage measurement, expressed in decimal. To calibrate the pressure sensor, the user enters this equation, Eq. 1, into the unified program with the high level language. Once entered and compiled, the equation becomes part of the unified program. Of course, those skilled in the art will recognize that not all potential sensors produce a voltage signal amenable to such a formula. For example, a radiation sensor would probably produce a number of pulses. It is thus desirable, although not necessary, that the high level language have the ability to handle such alternative signals.

The next step in the method is Ordering 14. In Ordering, the user designates an order in which the sensors 1 (FIG. 1) will take measurements when the data gathering computer 2 (FIG. 1) is in the field. In the example above, the data gathering computer has pressure and temperature sensors. With such a system, the user might choose to take measurements in that order: pressure, then temperature. Alternatively, the user might choose to take more frequent measurements of one property: temperature, temperature, pressure. The order is user definable. Whichever order is chosen will repeat during the Measuring 18 step, e.g., pressure, temperature, pressure, temperature, and so on. The order is entered into the unified program with the high level language. Once entered and compiled, the Ordering routine becomes part of the unified program.

The next step is Timing 16. The sensors 1 (FIG. 1) take measurements under the direction of the unified program 3 (FIG. 1). In Timing, the user designates the amount of time that the unified program waits between directing measurements. For example, the user might choose to have the program wait 1 second between each measurement: pressure, (wait 1 second), temperature, (wait 1 second), pressure, (wait 1 second), temperature, (wait 1 second), and so on. Alternatively, the user might choose to stagger the time between measurements: pressure, (wait 1 second), temperature, (wait 1 day), pressure, (wait 1 second), temperature, (wait 1 day), pressure, (wait 1 second), and so on. The Timing is user definable. Timing is entered into the unified program with the high level language. Once entered and compiled, the Timing routine becomes part of the unified program.

Once the Associating 10, Calibrating 12, Ordering 14 and Timing 16 relationships are entered in the high level language, they are compiled and become part of the unified program 3 (FIG. 1). For the purposes of this invention, the high level language could be BASIC, Pascal, FORTRAN, C or any other language capable of defining the steps of the method. For the example system above, the unified program might appear as follows in the high level language:

| | | |
|---|---|---|
| here | loop 8 | (do section to endloop eight times) |
| | vhigh | (voltage to five volts) |
| | pinlow 0 | (power up sensors) |
| | sleep 1 | (wait 1/10 second) |
| | adreject v0 | (measure pressure) |
| | adreject v1 | (measure temperature) |
| | vlow | (back to 3v) |
| | pinhigh 0 | (power off) |
| | lcdpoint "press=", v0, press | (display pressure) |
| | sleep 37 | (wait for 3.7 seconds) |
| | lcdpoint "temp=", v1, dotemp | (display temperature) |
| | endloop | (end of loop) |
| | plotpoint "trip", v0, press | (store & plot data every min) |
| | plotpoint "trip", v1, dotemp | (store & plot data every min) |
| | ifnotfull here | (loop back for more data until full) |
| | display "FULL" | |
| | stop | (lowest power mode when full) |
| press | procedure "pressure" | |
| | fmult 2014 | (this is the gain term) |
| | decimal 2 | |
| | endproc "P=", "psi" | (that's the result in psi) |
| dotemp | procedure "temperature" | |
| | temp f | |
| | endproc "F⇌ | (display °F., units='F' in plot) |

The example unified program begins at the line 'here,' with the command 'loop 8'. 'Loop 8' directs the unified program to loop to the 'endloop' command eight times. The next command, 'vhigh', directs the data gathering computer 2 (FIG. 1) to enter a high power mode for gathering data 5 (FIG. 1). Next, the 'pinlow 0' command directs the data gathering computer to power up the sensors 1 (FIG. 1) for gathering data. 'Sleep 1' then directs the data gathering computer to enter a wait state for 0.1 seconds. When the wait is finished, the 'adreject v0' command directs the sensor connected to channel 0 to take a measurement. The 'adreject' command also causes an analog to digital conversion of the measurement, rejecting line noise. When the A-D conversion is done, the measurement is stored in variable v0. Variable v0 is thus associated with channel 0. The 'adreject v1' command causes a similar series of events with respect to channel 1 and variable v1. Variable v1 is thus associated with channel 1. Following the measurement of channel 1, the 'vlow' command directs the data gathering computer into a low power mode to conserve battery power. The 'pinhigh 0' command powers down the sensors for further conservation of battery power. The Associating 10 step is defined by the relationship between the variables and the channels. The adreject commands define the Measuring 18 step by controlling when measurements are taken. The order in which the adreject commands appear in the unified program defines, in part, the Ordering 14 step.

The next group of commands begins with the command: lcdpoint "press=", v0, press. The 'lcdpoint' command directs the data gathering computer 2 (FIG.

1) to display the string "press=" for one second, and then display the converted measurement produced by feeding the contents of variable v0 into the Calibrating 12 subroutine called 'press'. The next command, 'sleep 37', directs the data gathering computer to wait for 3.7 seconds before executing the next command. When 3.7 seconds have elapsed, the 'lcdpoint "temp=", v1, dotemp' command directs the data gathering computer to display the string "temp=" for one second, and then display the converted measurement produced by feeding the contents of variable v1 into the Calibrating 12 subroutine called 'dotemp'. The next command, 'sleep 37', directs the data gathering computer to wait for 3.7 seconds before executing the next command. The 'endloop' command directs the program back to the 'loop 8' step, unless the loop has been executed eight times. When the loop has been executed eight times, the program continues on to the next group of commands. The 'lcdpoint' commands define the Displaying 22 step by controlling when and what is displayed on the data gathering computer. The 'sleep' commands define the Timing 16 step by controlling the wait time between directing measurements.

The next group of commands begins with the command: plotpoint "trip", v0, press. This command directs the data gathering computer 2 (FIG. 1) to store the value of variable v0. The string "trip" and the Calibrating 12 subroutine 'press' are designated for the purpose of converting the data 5 (FIG. 1) in the Interpreting 28 step. The command 'plotpoint "trip", v1, doterap' directs the data gathering computer in a similar fashion with respect to the value of variable v1. The string "trip" and the Calibrating 12 subroutine 'dotemp' are designated for the purpose of converting the data in the Interpreting 28 step. The 'plotpoint' commands define, in part, the Ordering 14 step by controlling the order in which data is stored. The plotpoint commands also define the Storing 20 step by determining which data is stored, and which data is discarded.

The next group of commands begins with the 'ifnotfull here' command. The ifnotfull command directs the unified program to the line designated as 'here,' provided the memory has room to store further data 5 (FIG. 1). The line 'here' is the first line of the program. If the memory has no further room to store data, the unified program proceeds to the next command: display "FULL." The 'display' command directs the data gathering computer 2 (FIG. 1) to display the string "FULL." The 'stop' command then directs the unified program to cease execution and causes the data gathering computer to enter a low power mode. The ifnotfull command defines the Looping 24 step by controlling the conditions under which the Measuring 18, Storing 20 and Displaying 22 cycle ends. In the example unified program, the cycle ends when memory is full. However, the cycle could be set to terminate on a given number of iterations by replacing the 'ifnotfull' command with 'loop' commands such as 'loop 10' and 'endloop'. The cycle could thus be set to terminate after ten iterations.

The next group of commands form the 'press' subroutine. The 'procedure "pressure"' command is a marker for the start of the subroutine. The 'fmult 2014' command directs the data gathering computer 2 (FIG. 1) to multiply the number 2014 by the number in the data gathering computer's accumulator (not illustrated), which would be v0, and then divide by 32768, leaving the result in the accumulator. This represents the gain term in the present example. The command 'decimal 2' sets the decimal point position to two places. Finally, the 'endproc "P=", "psi"' command is an end of subroutine marker. The tag "psi" identifies the engineering units for use with the Interpreting 28 step.

The next group of commands form the 'doterap' subroutine. The 'procedure "temperature"' command is a marker for the start of the subroutine. The 'temp f' command converts the variable in the accumulator to °F. with a predefined subroutine (not specifically illustrated). The predefined subroutine functions in the same manner as the user defined subroutine. However, the predefined subroutine is not user modifiable. The predefined subroutine is stored at a dedicated memory address in the data gathering computer 2 (FIG. 1). The program is arranged such that v1 is in the accumulator when the 'temp f' command is executed. Predefined subroutines may be used to simplify user programming in the unified program, provided the response curve of the sensor 1 (FIG. 1) is known. The 'endproc "F="' command is an end of subroutine marker. The tag "°F." is automatically associated with this predefined subroutine to identify the engineering units for use with the Interpreting 28 step. The 'press' and 'dotemp' subroutines define the Calibrating 12 step by controlling the manner in which data 5 (FIG. 1) is converted into meaningful numbers.

Before the next step in the method begins, the data gathering computer 2 (FIG. 1) and its sensors 1 (FIG. 1) are taken into the field. Once in the field, the method continues with the Measuring 18 step. In Measuring 18, the unified program 3 (FIG. 1) directs the sensors to take measurements according to parameters set down in the Ordering 14 and Timing 16 steps.

The next step in the method is Storing 20. In Storing, data 5 (FIG. 1) is stored in the data gathering computer's memory. Preferably, the data is stored in the unconverted form, i.e., raw voltage values. The unconverted data requires less memory space than the converted data. Also, the data is stored without the tag, e.g., °F., which would indicate the engineering units that the data would represent if it were converted. Such a tag uses valuable memory space.

The Storing 20 step also includes a one time entry that designates a start time (not illustrated). The start time is the time at which the first measurement is taken by the data gathering computer 2 (FIG. 1) in the field. The start time can be stored in the memory of the data gathering computer along with the first data measurement. Storing only one time measurement saves a tremendous amount of memory. For the purposes of the present invention, any stored data other than fully converted data with engineering unit tags and a measurement time for each measurement constitutes compressed data.

Since Measuring 18 and Storing 20 are controlled by independent routines, data 5 (FIG. 1) can be stored selectively. In the example unified program listed above, measurements are taken about every 3.8 seconds for display. However, measurements are stored only once every minute. The unified program thus allows selective storage of data.

The next step in the method is Displaying 22. In Displaying, selected measurements are temporarily displayed on the data gathering computer 2 (FIG. 1). The measurements can be displayed in the converted form, tagged with the appropriate engineering units. The conversion to meaningful numbers tagged with engineering units is done with the Calibrating 12 subroutines. The displayed form of the measurement is solely for the consumption of the user, as it is not stored in the data gathering computer's memory. The displayed measurement can be used for spot checking the present measurement value. In order to conserve power, the display 7 (FIG. 2) can be disabled when it is not being utilized.

The next step in the method is Looping 24. In Looping, the unified program 3 (FIG. 1) determines if more measurements should be taken. If the unified program determines that more measurements should be taken, the program returns to the Measuring 18 step and takes measurements according to the Ordering 14 and Timing 16 steps. If the unified program determines that no more measurements should be taken, the program ceases to direct the sensors 1 (FIG. 1) to take measurements and awaits the Copying 26 step.

In normal operation, the user may have the unified program loop through the Measuring 18, Storing 20 and Displaying 22 cycle until the data gathering computer 2 (FIG. 1) is retrieved from the field for data 5 (FIG. 1) download and analysis. The user can then direct the unified program to cease Looping 24 with controls on the data gathering computer. However, there are certain other conditions under which it may be desirable for the Looping to stop. For example, the user may wish for the program to cease Looping if the available memory storage space has dropped to zero. The user can optionally have the program stop or rewrite over stored data starting from the first measurement. The user defines the conditions under which the Looping will cease. The conditions are defined in the high level language that was used to define the Ordering 14 and Timing 16 steps. It is thus a fairly simple matter for the user to define a wide range of conditions under which Looping will stop. For example, it could stop after a predetermined number of iterations, or upon the occurrence of some event.

Once Looping 24 is complete, the data 5 (FIG. 1) is ready to be downloaded for interpretation and analysis. At this point the data gathering computer 2 (FIG. 1) is transported to the site of the data display and analysis computer 4 (FIG. 1). Accordingly, after retrieval, the next step in the method is Copying 26.

Copying 26 is the last step to involve the data gathering computer 2 (FIG. 1). In Copying, the unified program 3 (FIG. 1) is copied into the data display/analysis computer 4 (FIG. 1) along with the data 5 (FIG. 1) which is stored in the data gathering computer's memory. The copy of the unified program 6 (FIG. 1) contains the information needed to produce converted data, tagged with engineering units and a measurement time for each measurement, from the stored data 5 (FIG. 1). The physical act of copying is typically accomplished through a standard serial connection between the computers. The implementation of such a serial connection to accomplish the act of copying is well known in the art.

The unified program is 'unified' since it is used by both the data gathering computer and the data display/analysis computer. Prior art systems use two entirely separate programs; one in the data gathering computer and one in the data display/analysis computer.

Once the data display/analysis computer 4 (FIG. 1) has the data 5 (FIG. 1), it must interpret the data before any use can be made of it. The goal in Interpreting 28 is to produce converted data, tagged with engineering units and a measurement time for each measurement. The data is interpreted in the Interpreting step.

Figure 5:
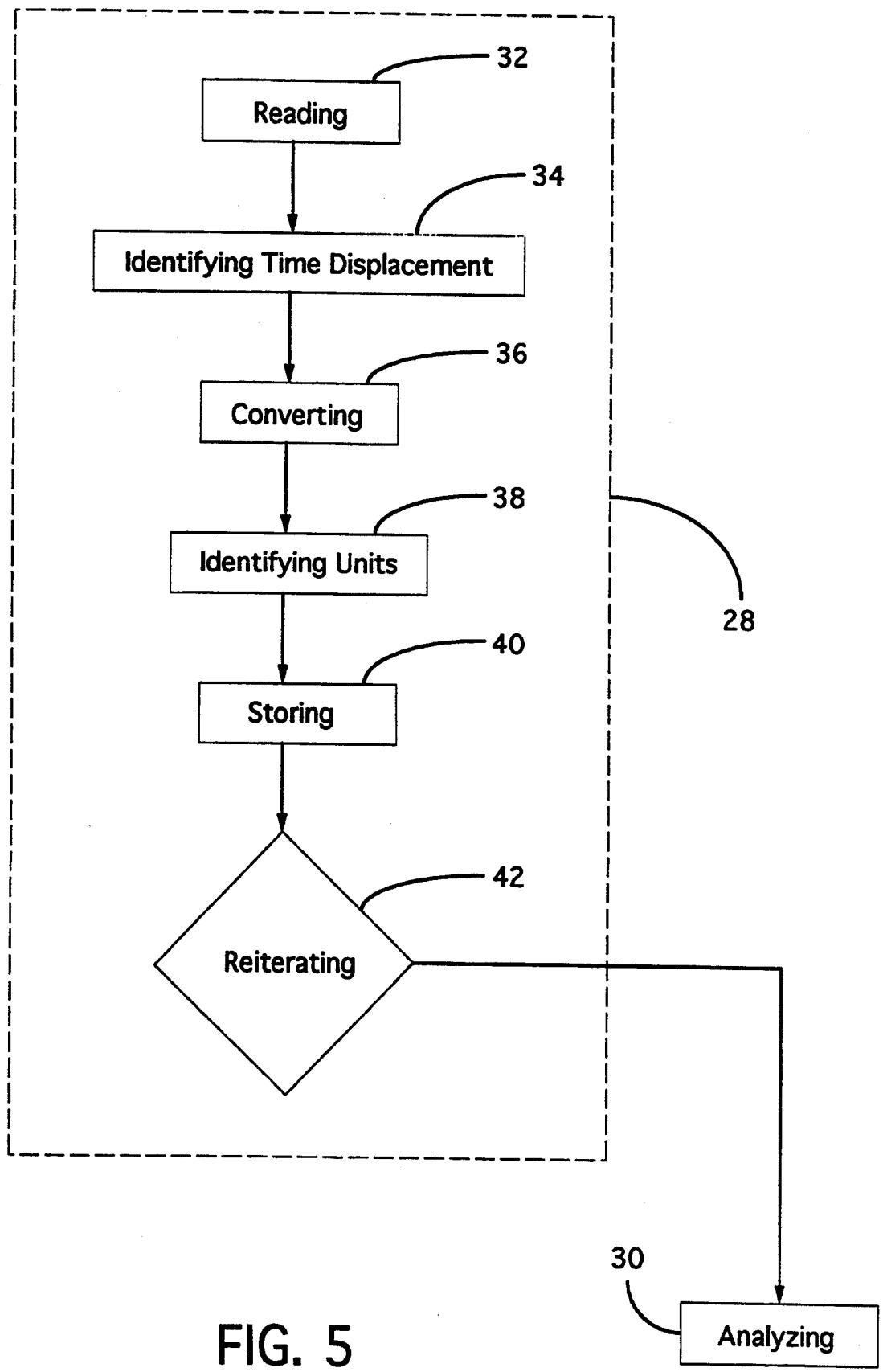
FIG. 5 is a flow chart which further illustrates the Interpreting Step of FIG. 4.

FIG. 5 is a flow chart which illustrates the Interpreting 28 step of FIG. 4. The Interpreting 28 step includes a Reading 32 step, an Identifying Time Displacement 34 step, a Converting 36 step, an Identifying Units 38 step, a Storing 40 step and a Reiterating 42 step.

The first step in Interpreting 28 is Reading 32. In Reading, the data analysis program in the data display/analysis computer 4 (FIG. 1) sequentially reads the copied raw measurement data 5 (FIG. 1) from memory. The raw measurement data is read in the same order in which it was stored by the data gathering computer 2 (FIG. 1), i.e., chronological order. The start time that was stored with the first measurement is also read.

Next, in Identifying Time Displacement 34, the measurement time is associated with each successive raw measurement. As each raw measurement is read, the data analysis program in the data display/analysis computer references the Timing 16 (FIG. 4) information in the unified program. The Timing information informs the data analysis program that the measurements were taken with particular waiting periods between measurements, e.g., pressure, (wait 1 second), temperature, (wait 1 second), pressure, (wait 1 second), an so on. The data analysis program then associates a time displacement with each raw measurement according to the Timing information, e.g., 1st measurement was taken at known start time X, 2 nd measurement was taken at X+1 second, 3rd measurement was taken at X+2 seconds, 4th measurement was taken at X+3 seconds, and so on. Using the known start time and the time displacement, the data analysis program determines the precise time when each measurement was taken. To do this, the data analysis program steps through the copy of the unified program 6 (FIG. 1).

In Converting 36, the raw measurement is converted into meaningful numbers that reflect measurements in the aforementioned engineering units, i.e., the converted measurement. To do this, the data analysis program references the appropriate Calibrating 12 (FIG. 4) subroutine in the unified program. The Calibrating subroutine informs the data analysis program of how to convert the raw measurement into meaningful numbers. Again, the data analysis program steps through the copy of the unified program 6 (FIG. 1).

Next, in Identifying Units 34, the now converted measurement is tagged with its appropriate engineering units. To tag the converted measurement, the data analysis program references the appropriate Calibrating 12 (FIG. 4) subroutine in the unified program. The Calibrating subroutine informs the data analysis program that the measurement should be tagged with a particular engineering unit. The data analysis program then tags the converted measurement accordingly.

Next, in Storing 40, the now converted and tagged measurement is stored in the data display/analysis computer's memory. The converted and tagged measurement is stored along with the measurement time that designates the time when the measurement was taken.

Finally, in Reiterating 42, the data analysis program determines if the Interpreting 28 step should be repeated. Interpreting is repeated until every raw measurement is interpreted. When all the raw measurements are interpreted, the method continues with the Analyzing 30 step.

The data analysis program executes the Interpreting 28 step by moving sequentially through the copy of the unified program 6 (FIG. 1). However, the data analysis program is designed to ignore certain commands that are only needed for data gathering, and respond differently to other commands. The example below shows a copy of the unified program already recited herein with the data analysis program's interpretation in bold.

enhancements are resident in the data analysis program. More esoteric enhancements may be entered by the user with the high level language.

The method of the present invention offers a number of advantages over previous methods. Previous methods of gathering and analyzing data from remote sites operate between two extremes. The first extreme provides flexibility, but requires too much memory. The

| | | |
|---|---|---|
| here | loop 8 | (do section to endloop eight times) |
| here | loop 8 | |
| | vhigh | (voltage to five volts) |
| | ignore | |
| | pinlow 0 | (power up sensors) |
| | ignore | |
| | sleep 1 | (wait 1/10 second) |
| | add 1/10 second to present time displacement | |
| | adreject v0 | (measure pressure) |
| | ignore | |
| | adreject v1 | (measure temperature) |
| | ignore | |
| | vlow | (back to 3v) |
| | ignore | |
| | pinhigh 0 | (power off) |
| | ignore | |
| | lcdpoint "press=", v0, press | (display pressure) |
| | ignore | |
| | sleep 37 | (wait for 3.7 seconds) |
| | add 3.7 seconds to the present time displacement | |
| | lcdpoint "temp=", v1, dotemp | (display temperature) |
| | ignore | |
| | endloop | (end of loop) |
| | endloop | |
| | plotpoint "trip", v0, press | (plot data every min) |
| | read next value stored and identify time | |
| | (time=present time displacement + start time) | |
| | access subroutine press for converting | |
| | plotpoint "trip", v1, dotemp | |
| | read next value stored and identify time | |
| | (time=present time displacement + start time) | |
| | access subroutine dotemp for converting | |
| | ifnotfull here | (loop back for more data until full) |
| | if there are any more stored measurements, go to here otherwise, continue | |
| | display "FULL" | |
| | ignore | |
| | stop | (lowest power mode when full) |
| | stop - Interpreting complete | |
| press | procedure "pressure" | |
| press | procedure "pressure" | |
| | fmult 2014 | (this is the gain term) |
| | fmult 2014 | |
| | decimal 2 | |
| | decimal 2 | |
| | endproc "P=", "psi" | (that's the result in psi) |
| | store the resulting measurement with the tag "psi" | |
| | store along with time when taken | |
| dotemp | procedure "temperature" | |
| dotemp | procedure "temperature" | |
| | temp f | |
| | temp f | |
| | endproc "F" | (display °F., units='F' in plot) |
| | store the resulting measurement with the tag "°F." | |
| | store along with time when taken | |

Turning now to FIG. 4, the next step in the method is Analyzing 30. In Analyzing, the interpreted data generated in the Interpreting 28 step is subjected to analysis, thereby making it more useful to the user. The data analysis program can produce graphs for printing, append the interpreted data to other files for a statistical analysis of greater scope, or other similar tasks. Also, the interpreted data can be further enhanced. For example, combinations of interpreted data measurements can be used in formulas or tables to produce other data measurement parameters for which no sensor exists. Also, conversion may be made between unit systems, e.g., English to metric. The most common of these second extreme requires relatively less memory than the first extreme, but severely limits flexibility. Prior art systems operating between the two extremes suffer to some degree from the drawbacks of both extremes.

In the first extreme, the data gathering computer stores completely interpreted data. Such interpreted data would include measurements in converted meaningful numbers, stamped with their engineering units, and associated with a time at which the measurement was taken. With such a system, any computer with a generic analyzing program can be used to analyze the data provided by the data gathering computer. However, the amount of memory required in the data gathering computer for such a system is staggering. The increased memory costs in terms of money, size and power requirements. Generally speaking, it is impractical to construct a system according to the method of the first extreme.

In the second extreme, the data gathering computer stores only raw data measurements, and an entirely separate interpreting program is written to interpret the raw data in the data display/analysis computer. With such a system, the author of the separate interpreting program needs to know the detailed information necessary to interpret the raw data. The author must know how the sensors were associated with their channels, the response curve of each sensor, the order in which measurements were taken, the start time and the time intervals between measurements. However, even when such a program is written, it is only useful for interpreting data from the type of data gathering computer it was written to work with. More particularly, the separate program can't interpret data stored with different associating, calibrating, ordering or timing parameters. Such a separate program is thus specific, rather than generic. This means that the user must distinguish between groups of data gathering computers that are retrieved from the field, and match each group up with its particular interpreting program. This task becomes logistically undesirable when appreciable numbers of data gathering computers are used.

The method of the present invention provides the flexibility of the first extreme with the memory usage efficiency of the second extreme. With a system according to the present invention, any data gathering/analysis computer with a generic data analysis program can interpret the data stored in any data gathering computer with the unified program. With the method of the present invention, the user need not be concerned with which sensors were associated with which channels, or how measuring was ordered and timed.

In the embodiment described above, the Associating, Calibrating, Ordering, Timing, Measuring, Storing and Displaying steps are user definable. However, the Copying and Interpreting steps of the present invention could function equally well if all or a combination of the other steps were predefined. Such embodiments are thus deemed to be within the scope of the invention.

Figure 6:
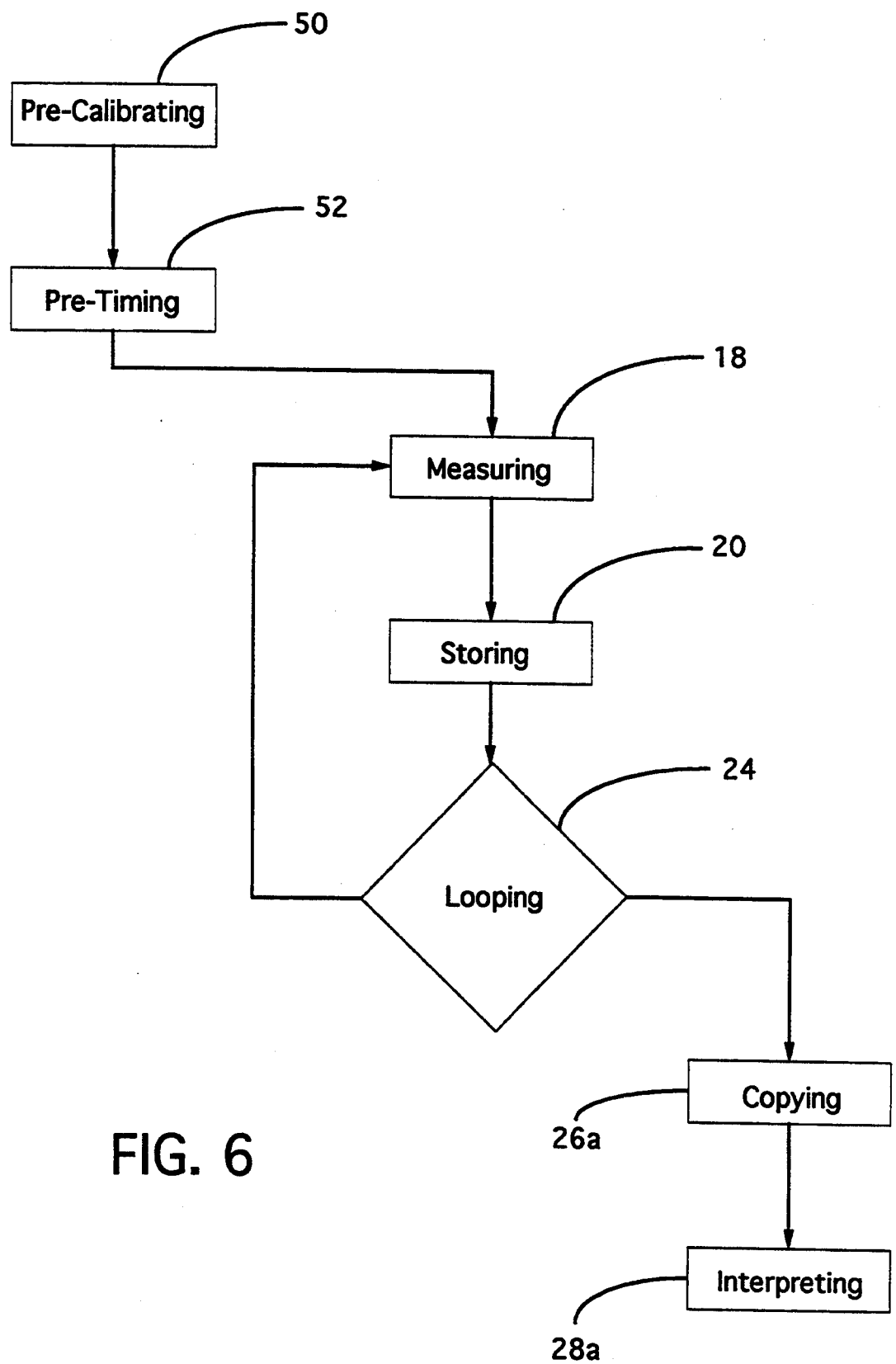
FIG. 6 illustrates a first alternative embodiment of the method according to the present invention.

FIG. 6 illustrates a first alternative embodiment of the method according to the present invention. This embodiment eliminates the need for user programming by providing a pre-programmed data gathering computer. The embodiment includes a plurality of steps: pre-Calibrating 50, pre-Timing 52, Measuring 18, Storing 20, Looping 24, Copying 26a and Interpreting 28a. In this embodiment, the data gathering computer 2 (FIG. 1) has only one sensor 1 (FIG. 1). This single sensor is permanently connected to the data gathering computer. Such a sensor arrangement obviates the need for the Associating 10 (FIG. 4) and Ordering 14 (FIG. 4) steps of the original embodiment.

The first step in the first alternative is pre-Calibrating 50. In pre-Calibrating, the Calibrating 12 (FIG. 4) subroutine, which is a mathematical approximation of the sensor's response curve, is stored in the data gathering computer to provide a Calibrating routine. However, the routine is permanently stored in the data gathering computer's memory, rather than in the unified program 3 (FIG. 1). Preferably, the routine is stored in the memory at a dedicated address.

The second step is pre-Timing 52. In pre-Timing, the Timing 16 (FIG. 4) routine is stored in the data gathering computer 2 (FIG. 1). The Timing routine specifies a time interval between successive measurements. The Timing routine is also permanently stored in the data gathering computer's memory, rather than in the unified program. Preferably, the Timing routine is stored in the memory at a dedicated address.

Because the pre-Calibrating and pre-Timing steps are predefined and stored in permanent memory, the user need not write or modify the unified program. Further, a highly simplified alternative program can operate the data gathering computer in lieu of the unified program. The highly simplified alternative program could appear as follows:

| here | adreject | (take measurement) |
|------|----------|--------------------|
|      | store    | (store measurement) |
|      | wait <address 1> | (wait for interval at address 1) |
|      | goto here | (repeat the cycle) |
| <address> | <time interval> | (Timing routine) |
| <address> | <Calibrating subroutine> | (Calibrating routine) |

The next three steps, Measuring 18, Storing 20 and Looping 24, are executed as previously described with respect to the first embodiment. However, rather than referring to the unified program 3 (FIG. 1) for the Timing routine, the data gathering computer refers to the dedicated memory address where the Timing routine is stored.

Similarly, in the Copying 26a step, the data display/analysis computer copies the Calibrating routine and Timing routine from their respective memory addresses, rather than the unified program. The Interpreting 28a step then continues with a generic data analysis program stepping through the copied routines.

As a second alternative embodiment, the pre-Timing 52 step includes a table of predefined Timing routines from which the user can choose. Strictly preprogrammed steps offer ease of use at the expense of flexibility. In order to provide added flexibility without requiring user programming, a table of routines is presented to the user. For example, the user could be given a choice of intervals between measurements including: one second, one minute, five minutes, ten minutes and one hour. The table of predefined Tinning routines is stored in a dedicated memory address other than the Timing routine memory address. To alter the present Timing routine, a Timing routine chosen from the table is copied into the dedicated Timing routine address.

Those skilled in the art will appreciate that a system with multiple sensors 1 (FIG. 1) and preprogrammed Calibrating 12 (FIG. 4), Associating 10 (FIG. 4), Timing 16 (FIG. 4) and Ordering 14 (FIG. 4) routines, or tables of such routines, would be useful for certain applications. Such routines or sets of routines could be stored at dedicated memory locations for access by the data gathering computer and data display/analysis computer. Accordingly, such systems are deemed to be within the scope of the invention.

As a third alternative embodiment, any combination of steps could be defined by either the routines in the unified program or the routines located at memory addresses. The unified program could define one or more of Calibrating, Ordering and Timing. Likewise, the routines located at memory addresses could define one or more of Calibrating, Ordering and Timing.

With such a system, the data gathering computer is customized to provide maximum data storage space in memory. For example, the user may only need to vary Timing intervals for a particular application. Assuming that the parameters of the other steps are known, only the Timing routine is needed for Interpreting the data. By storing only the Timing routine in the data gathering computer, memory storage space is maximized. This Timing routine could be defined by the unified program or stored at a memory address. Similar systems could be designed with any step or combination of steps to provide the most efficient memory usage for a particular application.

While there have been described herein various specific embodiments, it will be appreciated by those skilled in the art that various other embodiments are possible in accordance with the teachings of the present invention. Therefore, the scope of the invention is not meant to be limited by the disclosed embodiments, but is defined by the appended claims.

What is claimed is:

1. A method of gathering and analyzing data in a system having a first device for taking measurements and gathering data and a second device for analyzing data, where the first device is disconnected from the second device while taking measurements and gathering data, and then connected to the second device for analyzing the data, comprising the steps of:

measuring one or more physical properties with the first device while the first device is disconnected from the second device, said measuring controlled by a unified program to provide measurement data;

storing said measurement data in the first device in a compressed form;

connecting the first device to the second device such that the first device and second device are in communication;

copying both said compressed measurement data and said unified program from the first device to the second device; and interpreting said compressed measurement data in the second device with said copied unified program.

2. The method of claim 1, wherein said interpreting step includes an identifying time step which provides a time of measurement associated with each measurement.

3. The method of claim 2, wherein said interpreting step includes a converting step which provides converted data in engineering units from said compressed measurement data.

4. The method of claim 3, wherein said interpreting step includes an identifying units step which provides an engineering unit tag associated with each measurement.

5. A data gathering and analysis system which provides an ability to collect data in a remote field site and then interpret the collected data at any one of a number of data interpretation sites, which comprises:

a data gathering computer having one or more channels with sensors connected thereto for taking measurements of physical properties, said data gathering computer operative to take and store measurement data;

a unified program located in said data gathering computer, said unified program controlling said data gathering computer to direct measurement taking and storing;

a data display/analysis computer having a generic data analysis program, said data gathering computer being connected to said data display/analysis computer to copy said unified program and said measurement data from said data gathering computer to said data display/analysis computer, said generic data analysis program operative to interpret said copied measurement data by utilizing said copied unified program, whereby said data gathering computer gathers data while disconnected from said data display/analysis computer.

6. The data gathering and analysis system of claim 5, wherein said unified program includes means for associating each sensor with a particular channel.

7. The data gathering and analysis system of claim 6, wherein said unified program includes a calibration routine for each sensor.

8. The data gathering and analysis system of claim 7, wherein said unified program includes means for directing an order in which the sensors take measurements of physical properties.

9. The data gathering and analysis system of claim 8, wherein said unified program includes means for directing timing between measurements taken by the sensors.

10. The data gathering and analysis system of claim 9, wherein said unified program includes means for directing the sensors to take measurements.

11. The data gathering and analysis system of claim 10, wherein said unified program includes means for directing storing of selected measurements according to a predetermined storing routine.

12. The data gathering and analysis system of claim 11, wherein said unified program includes means for directing looping through said means for directing the sensors to take measurements and said means for directing storing of selected measurements according to a predetermined storing routine.

13. The data gathering and analysis system of claim 12, wherein said unified program is user definable in a high level language.

14. The data gathering and analysis system of claim 13, wherein said generic data analysis program interprets said measurement data by stepping sequentially through said unified program.

15. A method of gathering and analyzing data with a first device and a second device, the first device having a sensor which is responsive to a physical property, and also having a memory, comprising:

pre-calibrating the sensor by providing a calibration routine, said calibration routine stored in the first device;

pre-timing measurements by providing a timing routine, said timing routine stored in the first device;

measuring physical properties according to said timing routine while the first device is disconnected from the second device to provide data;

storing said data in a compressed form;

looping through said measuring and storing steps according to said timing routine;

connecting the first device to the second device;

copying said data in compressed form and said calibration routine and said timing routine from the first device to the second device; and interpreting said copied data in compressed form in a generic data analysis program according to said copied calibration routine and said copied timing routine.

16. The method of claim 15, wherein said timing routine is chosen from a table of timing routines.

17. A method of gathering and analyzing data with a first device and a second device, the first device having a plurality of sensors connected to channels, each sensor responsive to a physical property, the first device also having a memory, comprising:
- pre-associating the sensors with the channels by providing an associating routine, said associating routine stored in the first device;
- pre-calibrating the sensors by providing a calibration routine, said calibration routine stored in the first device;
- pre-ordering a sequence in which the sensors take measurements by providing an ordering routine, said ordering routine stored in the first device;
- pre-timing the measurements by providing a timing routine, said timing routine, said timing routine stored in the first device;
- measuring physical properties, while the first device is disconnected from the second device according to said associating routine, said ordering routine and said timing routine to provide data;
- storing said data in a compressed form;
- looping through said measuring and storing steps according to said ordering routine and said timing routine;
- connecting the first device to the second device;
- copying said data in compressed form and said associating routine, said calibrating routine, said ordering routine and said timing routine from the first device to the second device; and
- interpreting said copied data in compressed form in a generic data analysis program according to said copied associating routine, said copied calibrating routine, said copied ordering routine and said copied timing routine.

18. The method of claim 17, wherein said timing routine is chosen from a table of timing routines.

19. The method of claim 17, wherein said ordering routine is chosen from a table of ordering routines.

20. The method of claim 17, wherein said associating routine is chosen from a table of associating routines.

21. The method of claim 17, wherein said calibrating routine is chosen from a table of calibrating routines.

* * * * *